(12) United States Patent
Veeraswamy et al.

(10) Patent No.: US 10,270,796 B1
(45) Date of Patent: Apr. 23, 2019

(54) DATA PROTECTION ANALYTICS IN CLOUD COMPUTING PLATFORM

(71) Applicant: EMC Corporation, Hopkinton, MA (US)

(72) Inventors: Sairam Veeraswamy, Coimbatore (IN); Upanshu Singhal, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 421 days.

(21) Appl. No.: 15/081,246

(22) Filed: Mar. 25, 2016

(51) Int. Cl.
*H04L 29/06* (2006.01)

(52) U.S. Cl.
CPC .......... *H04L 63/1433* (2013.01); *H04L 63/20* (2013.01)

(58) Field of Classification Search
CPC .. H04L 63/1433; H04L 63/20; G06F 11/1435; G06F 11/3086; G06F 11/301; G06F 11/30194; G06F 11/30525; G06F 11/30; G06F 11/30722; G06F 11/30997; G06F 2211/104; G06F 2212/466; G06F 2212/7207; G01N 33/48792; G01N 2015/1402
USPC .......................................................... 726/25
See application file for complete search history.

(56) References Cited

U.S. PATENT DOCUMENTS

| 7,865,535 B2* | 1/2011 | Brodsky | G06F 17/3089 |
| | | | 707/709 |
| 9,098,617 B1* | 8/2015 | Pauley, Jr. | G06F 11/3604 |
| 9,471,404 B1* | 10/2016 | Ambrosio | G06F 9/543 |
| 9,813,450 B1* | 11/2017 | Wasiq | H04L 63/20 |
| 2004/0133552 A1* | 7/2004 | Greenfield | G06F 17/3041 |
| 2007/0027904 A1* | 2/2007 | Chow | G06F 17/30427 |
| 2009/0307273 A1* | 12/2009 | Johnson | G06F 21/55 |
| 2010/0088317 A1* | 4/2010 | Bone | G06F 17/30094 |
| | | | 707/737 |

(Continued)

OTHER PUBLICATIONS

Enabling Big Data Analytics in the Hybrid Cloud using Iterative MapReduce; Francisco J. Clemente-Castell et al., 2015 IEEE/ACM 8th International Conference on Utility and Cloud Computing, 2015.*

(Continued)

*Primary Examiner* — Kambiz Zand
*Assistant Examiner* — Mahabub S Ahmed
(74) *Attorney, Agent, or Firm* — Ryan, Mason & Lewis, LLP (57) ABSTRACT

A system includes a metadata monitor configured to discover and manage metadata associated with a plurality of data protection mechanisms distributed and operating throughout a computing platform, and metadata representing a schema of the computing platform and one or more user applications executed thereon. The system also includes a data protection analytics manager comprising a set of one or more data protection analytics applications configured to determine, from the metadata, which resources are and are not protected by the plurality of data protection mechanisms. For the protected resources, the data protection analytics applications are configured to compute an effectiveness value, and for the non-protected resources, the data protection analytics applications are configure to compute an exposure value. A data protection model can then be adapted in a data protection mechanism-agnostic manner.

20 Claims, 9 Drawing Sheets

(56) References Cited

U.S. PATENT DOCUMENTS

| | | | | |
|---|---|---|---|---|
| 2010/0161557 | A1* | 6/2010 | Anderson | G06F 17/30088 707/638 |
| 2010/0262577 | A1* | 10/2010 | Pulfer | G06F 17/30011 707/608 |
| 2011/0047597 | A1* | 2/2011 | Mahaffey | G06F 21/564 726/3 |
| 2012/0102053 | A1* | 4/2012 | Barrett | G06F 17/30592 707/754 |
| 2012/0102074 | A1* | 4/2012 | Mital | G06F 17/246 707/805 |
| 2012/0240236 | A1* | 9/2012 | Wyatt | G06F 21/564 726/25 |
| 2013/0246334 | A1* | 9/2013 | Ahuja | G06F 17/30713 707/600 |
| 2013/0246335 | A1* | 9/2013 | Ahuja | G06F 17/30713 707/600 |
| 2014/0164314 | A1* | 6/2014 | Ahuja | G06F 17/30713 707/600 |
| 2014/0173561 | A1* | 6/2014 | Toub | G06F 8/73 717/123 |
| 2014/0173683 | A1* | 6/2014 | Zhang | G06F 21/31 726/1 |
| 2014/0196105 | A1* | 7/2014 | Hung | H04L 63/20 726/1 |
| 2014/0229511 | A1* | 8/2014 | Tung | G06F 17/30292 707/803 |
| 2014/0280142 | A1* | 9/2014 | Wasson | G06F 17/30539 707/737 |
| 2014/0280380 | A1* | 9/2014 | Jagtap | G06F 17/30292 707/809 |
| 2014/0282843 | A1* | 9/2014 | Buruganahalli | H04L 63/0428 726/1 |
| 2014/0297569 | A1* | 10/2014 | Clark | G06Q 10/00 706/11 |
| 2014/0337429 | A1* | 11/2014 | Asenjo | H04L 65/403 709/204 |
| 2014/0372378 | A1* | 12/2014 | Long | G06F 11/1451 707/646 |
| 2015/0081640 | A1* | 3/2015 | Long | G06F 11/1451 707/646 |
| 2015/0163121 | A1* | 6/2015 | Mahaffey | G06F 11/0766 707/687 |
| 2015/0326601 | A1* | 11/2015 | Grondin | G06Q 10/0635 726/25 |
| 2015/0363270 | A1* | 12/2015 | Hammer | G06F 11/1451 711/162 |
| 2016/0080890 | A1* | 3/2016 | Shao | H04W 4/70 701/36 |
| 2016/0170844 | A1* | 6/2016 | Long | G06F 11/1469 707/679 |
| 2016/0191549 | A1* | 6/2016 | Nguyen | G06F 11/00 726/23 |
| 2016/0224430 | A1* | 8/2016 | Long | G06F 11/1451 |
| 2016/0224898 | A1* | 8/2016 | Ryckbosch | G06N 99/005 |
| 2016/0253340 | A1* | 9/2016 | Barth | G06F 17/30082 707/756 |
| 2016/0366187 | A1* | 12/2016 | Kamble | H04L 63/20 |
| 2017/0063883 | A1* | 3/2017 | Franzoni | H04L 63/1416 |
| 2017/0102693 | A1* | 4/2017 | Kidd | G05B 19/41865 |
| 2017/0102960 | A1* | 4/2017 | Dwarampudi | G06F 11/1448 |
| 2017/0185663 | A1* | 6/2017 | Gerweck | G06F 17/30592 |
| 2017/0193239 | A1* | 7/2017 | Chari | G06F 21/577 |
| 2017/0329837 | A1* | 11/2017 | Barrett | G06F 17/30592 |
| 2018/0027006 | A1* | 1/2018 | Zimmermann | H04L 63/0245 726/11 |
| 2018/0109548 | A1* | 4/2018 | Boss | H04L 63/1416 |

OTHER PUBLICATIONS

SDDC: A Software Defined Datacenter Experimental Framework, Ala' Darabseh et al., 2015 3rd International Conference on Future Internet of Things and Cloud, 2015.*

A Secure Hybrid Cloud Enabled Architecture for Internet of Things, Avani Sharma et al., 978-1-5090-0366-2/15/$31.00 © 2015 IEEE, 2015.*

Performance of Hadoop Application on Hybrid Cloud, Hayata Ohnaga et al, 2015 International Conference on Cloud Computing Research and Innovation, 2015.*

Software Defined Green Data Center Network with Exclusive Routing, Dan Li, IEEE Infocom 2014—IEEE Conference on Computer Communications, 2014.*

A Hybrid Cloud Infrastructure for Big Data Applications, Daniela Loreti et al., 2015 IEEE 12th International Conf on Embedded Software and Systems (ICESS), 2015.*

Design and Implementation of Organizational Authorization for a Network Monitoring System, Kenji Matsuura, 2014 Second International Symposium on Computing and Networking, 2014.*

EQVMP: Energy-efficient and QoS-aware Virtual Machine Placement for Software Defined Datacenter Networks, Shao-Heng Wang et al., 978-1-4799-3689-2/14/$31.00 © 2014 IEEE, 2014.*

MapReduce over the Hybrid Cloud: a novel Infrastructure Management Policy, Daniela Loreti et al., 2015 IEEE/ACM 8th International Conference on Utility and Cloud Computing, 2015.*

Next generation Cloud Computing Architecture Enabling real-time dynamism for shared distributed physical infrastructure, Vijay Sarathy, 2010 Workshops on Enabling Technologies: Infrastructure for Collaborative Enterprises.*

Cloud Computing: Security Model Comprising Governance, Risk Management and Compliance, Fawaz S. Al-Anzi, 978-1-4799-4674-7/14/$31.00 © 2014 IEEE, 2014.*

Mining and Managing Software Assets, Liam O'Brien, Proceedings of the 10th International Workshop on Software Technology and Engineering Practice (STEP'02), 2002.*

How to become a system administrator, 2014.*

Towards a Mobile Ad-hoc Cloud Management Platform, Ahmed Khalifa et al., 2014 IEEE/ACM 7th International Conference on Utility and Cloud Computing, 2014.*

Application of Asset Management in Managing Cyber Security of Complex Systems, Hugh Boyes et al., Sanjay Singh Kushwah et al., 2015.*

Infrastructural Assets Provisioning in Cloud Computing Systems, 2015 International Conference on Computational Intelligence and Communication Networks, 2015.*

The Design of Asset Management Service Platform in Universities Based on Cloud Computing Model , Liu Jun, 2013 International Conference on Mechatronic Sciences, Electric Engineering and Computer (MEC) Dec. 20-22, 2013, Shenyang, China, 2013.*

* cited by examiner

410 DISCOVER AND MANAGE METADATA, VIA A METADATA MONITOR OPERATIVELY COUPLED TO A COMPUTING PLATFORM, WHEREIN EACH OF THE METADATA MONITOR AND THE COMPUTING PLATFORM ARE IMPLEMENTED BY ONE OR MORE PROCESSING DEVICES, AND WHEREIN THE METADATA IS ASSOCIATED WITH A PLURALITY OF DATA PROTECTION MECHANISMS DISTRIBUTED AND OPERATING THROUGHOUT THE COMPUTING PLATFORM, AND THE METADATA REPRESENTS A SCHEMA OF THE COMPUTING PLATFORM AND ONE OR MORE USER APPLICATIONS EXECUTED ON THE COMPUTING PLATFORM

420 EXECUTE A SET OF ONE OR MORE DATA PROTECTION ANALYTICS APPLICATIONS, VIA A DATA PROTECTION ANALYTICS MANAGER IMPLEMENTED BY THE ONE OR MORE PROCESSING DEVICES AND OPERATIVELY COUPLED TO THE METADATA MONITOR, WHEREIN THE SET OF ONE OR MORE DATA PROTECTION ANALYTICS APPLICATIONS ARE CONFIGURED TO DETERMINE, FROM THE METADATA DISCOVERED AND MANAGED BY THE METADATA MONITOR, WHICH RESOURCES OF THE COMPUTING PLATFORM ARE PROTECTED BY THE PLURALITY OF DATA PROTECTION MECHANISMS AND WHICH RESOURCES OF THE COMPUTING PLATFORM ARE NOT PROTECTED BY THE PLURALITY OF DATA PROTECTION MECHANISMS, WHEREIN, FOR THE PROTECTED RESOURCES, THE SET OF ONE OR MORE DATA PROTECTION ANALYTICS APPLICATIONS IS CONFIGURED TO COMPUTE AN EFFECTIVENESS VALUE ATTRIBUTABLE TO THE PLURALITY OF DATA PROTECTION MECHANISMS, AND FOR THE NON-PROTECTED RESOURCES, THE SET OF ONE OR MORE DATA PROTECTION ANALYTICS APPLICATIONS IS CONFIGURED TO COMPUTE AN EXPOSURE VALUE ATTRIBUTABLE TO THE LACK OF DATA PROTECTION MECHANISMS

430 ADAPT, VIA THE DATA PROTECTION ANALYTICS MANAGER, A DATA PROTECTION MODEL DEFINED BY THE PLURALITY OF DATA PROTECTION MECHANISMS IN A DATA PROTECTION MECHANISM-AGNOSTIC MANNER BASED ON RESULTS OF EXECUTING THE SET OF ONE OR MORE DATA PROTECTION ANALYTICS APPLICATIONS

FIG. 5

DATA PROTECTION ANALYTICS IN CLOUD COMPUTING PLATFORM

FIELD

The field relates generally to data processing and, more particularly, to data protection workflow in a cloud computing platform.

BACKGROUND

A typical cloud computing platform operated by or for an enterprise deploys one or more data protection software tools or mechanisms to protect the application data, i.e., data input, output, or otherwise associated with applications programs executing on the cloud computing platform. Data protection includes, but is not limited to, data backup and data recovery functions. However, these data protection tools work in isolation from one another, and track only what is protected.

The advent of software defined data centers (SDDC) and big data functionality in a cloud computing platform increases the level of complexity in protecting the high volume of data, both "dark data" (i.e., unprocessed raw data) and "smart data" (i.e., transformed and analyzed data), in the enterprise. An SDDC is a computing system wherein elements of the infrastructure, e.g., networking, storage, compute, etc., are virtualized and delivered to tenants (customers or enterprise users) of the data center as services. An SDDC is typically implemented in a cloud computing platform environment and the virtualized and delivered components are typically controlled through an Infrastructure-as-a-Service (IaaS) layer.

An SDDC deployment based on a "hybrid cloud," wherein the data to be protected is spread beyond a single location (beyond the so-called "glass house"), multiplies the above-mentioned challenge. A hybrid cloud computing platform is a cloud computing deployment where part of the cloud computing resources (e.g., networking, storage, compute, etc.) are private cloud resources (e.g., within management and/or control of the enterprise, or within the glass house) and part of the cloud computing resources are public cloud resources (e.g., outside management and/or control of the enterprise, or outside the glass house).

SUMMARY

Embodiments of the invention provide data protection analytics techniques for use in cloud computing platforms. While the techniques are well adapted for SDDC environments with hybrid cloud deployments, the techniques may be applied to many other cloud computing platforms.

For example, in one embodiment, a system comprises the following components.

One or more processing devices are operatively coupled via a communications network.

A metadata monitor is operatively coupled to a computing platform, each of the metadata monitor and the computing platform are implemented by the one or more processing devices. The metadata monitor is configured to discover and manage metadata associated with a plurality of data protection mechanisms distributed and operating throughout the computing platform, and metadata representing a schema of the computing platform and one or more user applications executed on the computing platform.

A data protection analytics manager, implemented by the one or more processing devices, is operatively coupled to the metadata monitor, and comprises a set of one or more data protection analytics applications configured to determine, from the metadata discovered and managed by the metadata monitor, which resources of the computing platform are protected by the plurality of data protection mechanisms and which resources of the computing platform are not protected by the plurality of data protection mechanisms. For the protected resources, the set of one or more data protection analytics applications is configured to compute an effectiveness value attributable to the plurality of data protection mechanisms, and for the non-protected resources, the set of one or more data protection analytics applications is configured to compute an exposure value attributable to the lack of data protection mechanisms. The data protection analytics manager is further configured to adapt a data protection model defined by the plurality of data protection mechanisms in a data protection mechanism-agnostic manner based on results of executing the set of one or more data protection analytics applications.

In illustrative embodiments, the computing platform comprises an SDDC which includes a hybrid cloud deployment. Advantageously, the data protection analytics system discovers, collates, and organizes the metadata on what is to be protected, among them what is protected in the hybrid cloud deployment, what is the health of already protected data, what is not protected, etc. The set of analytics applications comprise exposure analytics (e.g., what is not protected, what is the impact of not protecting it and what is the cost of protecting it), root cause analytics on the issues with the data already being protected (e.g., data protection continuance, what is causing the configured backups to fail, and how to go about addressing them, etc.), data protection effectiveness analytics (e.g., do we really need to take backup, could we optimize the backup schedule and space, etc.) backup capacity prediction analytics, service level objective (SLO) conformance analytics, etc. Many other analytics can be implemented within the data protection analytics system.

These and other features and advantages of the invention will become more readily apparent from the accompanying drawings and the following detailed description.

DETAILED DESCRIPTION

Illustrative embodiments may be described herein with reference to exemplary cloud infrastructure, data repositories, data centers, data processing systems, computing systems, data storage systems and associated servers, computers, storage units, storage arrays, and devices such as processing devices. It is to be appreciated, however, that embodiments of the invention are not restricted to use with the particular illustrative system and device configurations shown. Moreover, the phrases "cloud infrastructure," "cloud platform," "data repository," "data center," "data processing system," "data storage system," "computing system," "computing environment," and the like as used herein are intended to be broadly construed, so as to encompass, for example, private, public or hybrid (part private and part public) cloud computing or storage systems, as well as other types of systems comprising distributed virtual infrastructure. However, a given embodiment may more generally comprise any arrangement of one or more processing devices.

With advances in cloud technology, conventional backup processes to protect and sustain the businesses that rely on an information technology (IT) backbone are no longer feasible. Embodiments of the present invention provide automated processing based on continuously discovering, collating and organizing metadata on what is to be protected, among them: what is protected in the hybrid cloud deployment; what is the health of already protected data; what is not protected, etc.

The components of SDDC, for example, platform and infrastructure, their application and configuration, and user data managed by these components are very dynamic and adaptive in nature. Conventional manual centric data protection workflow, for example, manually configuring a data protection application to protect an existing application and its data, does not scale well as the application configuration and its data change dynamically. Current generation backup tools are static in nature and are not equipped to adapt to the changing needs of the SDDC. Manually tracking the changes and reconfiguring the backup application is not a viable option.

In conventional workflow models, an administrator manually configures applications and data to be protected. Under conventional methods, an administrator is unable to reasonably reflect the creation of new applications and expansion of instances of data sets of existing applications on a data protection schema, and unable to reasonably configure the backup application. This problem becomes acute if there are structural changes in an IT organization, where IT administrators leave or divisions get reorganized. Accordingly, embodiments of the present invention include automatic tracking of applications and data sets that are to be protected, as well as keeping traces or inventories of applications and data sets that are not protected. Unprotected applications and their data sets increase the level of exposure to business processes.

Conventional approaches to data protection are monotonic in nature and backup administrators using conventional approaches are not aware whether backup targets and schedules match the protection level needed for the application configurations and the corresponding data. Conventional data protection approaches are also not able to scale to the needs of the data to be protected. For example, in a third platform environment, which includes inter-dependencies between mobile computing, social media, cloud computing, and big data information and analytics, given the volume and velocity of the data, conventional approaches, including manual configuration of data protection applications to match the scale of the data, provide grossly inadequate solutions in terms of efficiency and minimization of errors.

Further, conventional approaches fail to address errors that may occur while backing up data due to, for example, application failures or data access issues or backup device failures. These transient failures create gaps in a data protection schema. Notification alerts of the errors or failures may also be lost in the streams of messages tracked by the backup applications. These gaps at times cause recovery failures or inconsistencies, resulting in exposure to business processes when restoring an enterprise after a failure. Conventional approaches also fail to assess the effectiveness of a data protection workflow and schema that is already in place, resulting in overprotecting data with additional point in time copies, which unnecessarily consumes system resources including storage, network and compute bandwidth. Overprotection increases the cost of protection and may occur at the cost of not protecting other data sets.

In the space of server, application, storage and data management, embodiments of the present invention leverage the evolution of big-data platform and analytics techniques to discover, collate, organize, analyze, predict and recommend an optimal data protection approach and schema for a business enterprise. Embodiments of the present invention also provide data growth prediction and backup capacity planning suited to address the dynamic nature of SDDC and big data, and their application data sets.

As used herein, a "data protection mechanism" is intended to be broadly construed, so as to encompass, for example, any data protection functionality, such as a tool or other methodology, which is present in the SDDC or other computing platform.

Figure 1:
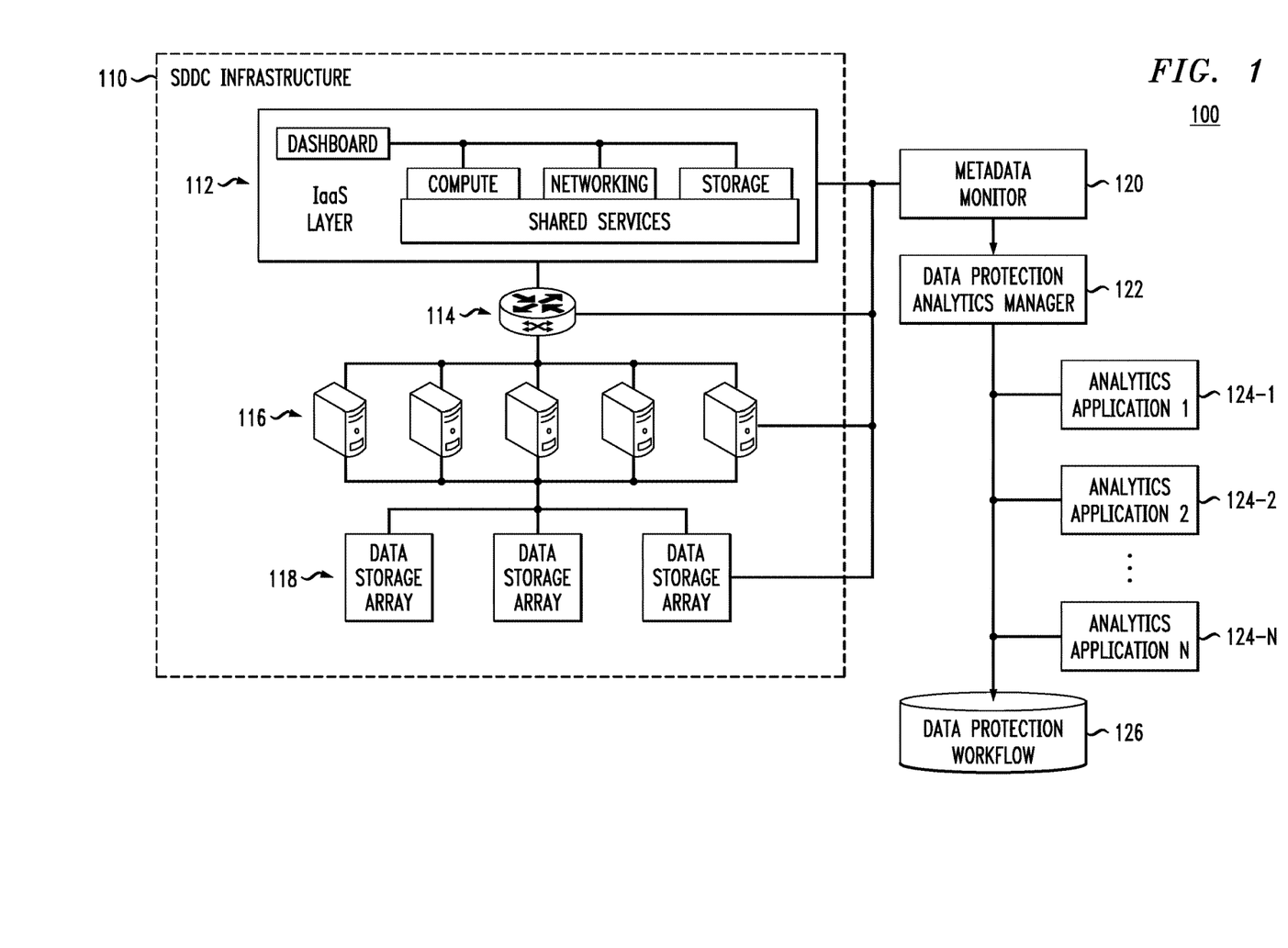
FIG. 1 illustrates an SDDC infrastructure environment with data protection analytics functionality according to an embodiment of the invention.

FIG. 1 illustrates an SDDC infrastructure environment with data protection analytics functionality according to an embodiment of the invention. As shown, the environment 100 comprises SDDC infrastructure 110, which itself comprises an IaaS layer 112, networking components 114 (e.g., routers, switches, etc.), compute components 116 (e.g., servers, hosts, etc.), and storage components 118 (e.g., storage arrays, storage devices, etc.).

By way of example only, the IaaS layer 112 may be implemented using OpenStack. As is known, OpenStack is a software platform that controls pools of compute, storage, and networking resources throughout a data center, managed through a dashboard or via the OpenStack application programming interface (API). OpenStack operates with enterprise and open source technologies enabling use with a wide variety of heterogeneous infrastructure components. Examples of storage arrays 118 may include, but are not limited to, VNX, VPLEX and Isilon storage systems (commercially available from EMC Corporation, Hopkinton, Mass.).

The environment 100 also comprises metadata monitor module 120, data protection analytics manager 122 including analytics applications 124-1, 124-2, . . . 124-N, and data protection workflow 126.

Metadata monitor module 120 receives output from existing monitoring tools that are integrated in the layers/components of SDDC infrastructure 110. Some examples of existing monitoring tools include, but are not limited to, Ceilometer for monitoring OpenStack, and Watch4Net (commercially available from EMC Corporation, Hopkinton, Mass.) for monitoring storage arrays/devices 118. Module 120 may also comprise separate standalone monitoring tools, i.e., not necessarily integrated with or part of the infrastructure component but which are configured to monitor operation, performance, behavior, etc., of an infrastructure component. The monitoring tools that are part of module 120 or that report to module 120 are the sources of system metrics data for use by the data protection analytics system 200, as will be further explained herein.

The metadata monitor module 120 is operatively coupled to a computing platform, for example, SDDC infrastructure 110 as shown in FIG. 1, a cloud computing deployment, a hybrid cloud computing deployment comprising, for example, an on-premise infrastructure and an off-premise infrastructure, and/or a big data platform. In an illustrative embodiment, on-premise refers to a private cloud infrastructure, and off-premise refers to a public cloud infrastructure. The metadata monitor module 120 is configured to discover and manage metadata associated with a plurality of data protection mechanisms distributed and operating throughout the SDDC infrastructure 110 or other computing platform, and metadata representing a schema of the SDDC infrastructure 110 or other computing platform, and one or more user applications executed on SDDC infrastructure 110 or other computing platform. As used herein, a "schema" is intended to be broadly construed, so as to encompass, for example a static structure that captures participating elements in a problem and solution space and the relationship among them.

The metadata monitor module 120 can obtain metadata from a data center management console, user-assisted discovery, and/or an active directory service.

At least a portion of the one or more user applications can be configured to each provide an application programming interface configured to report application profile information to the metadata monitor module 120, and/or to be responsive to a REST-based application programming interface configured to report application profile information to the metadata monitor module 120.

The data protection analytics manager 122 is operatively coupled to the metadata monitor module 120, and includes a set of one or more data protection analytics applications 124-1, 124-2, . . . 124-N configured to determine, from the metadata discovered and managed by the metadata monitor module 120, which resources of the SDDC infrastructure 110 or other computing platform are protected by the plurality of data protection mechanisms and which resources of the SDDC infrastructure 110 or other computing platform are not protected by the plurality of data protection mechanisms.

One or more of the data protection analytics applications 124-1, 124-2, . . . 124-N can be configured to compute, for the protected resources, an effectiveness value attributable to the plurality of data protection mechanisms, and/or to compute, for the non-protected resources, an exposure value attributable to the lack of data protection mechanisms.

The data protection analytics manager 122 is further configured to adapt a data protection workflow 126 defined by the plurality of data protection mechanisms. The adaptation is performed in a data protection mechanism-agnostic manner based on results of executing the set of one or more data protection analytics applications 124-1, 124-2, . . . 124-N.

One or more of the data protection analytics applications 124-1, 124-2, . . . 124-N can be further configured to generate a snapshot of the SDDC infrastructure 110 or other computing platform, determine a root cause of one or more failures of the plurality of data protection mechanisms, perform data protection capacity analysis and prediction, and/or determine service level objective conformance of the data protection workflow 126.

One or more of the data protection analytics applications 124-1, 124-2, . . . 124-N can be further configured to provide a data copy management function configured to mine metadata that keeps track of how many copies of the instances of an application are maintained in the SDDC infrastructure 110 or other computing platform and their profile. One or more of the data protection analytics applications 124-1, 124-2, . . . 124-N can be further configured to return one or more results representing an effectiveness of the data protection mechanisms. The one or more results can include: (i) the number of copies of application instance data that is maintained in the SDDC infrastructure 110 or other computing platform; (ii) the total size of the data and metadata for all the copies; (iii) a topology map of the copies for the data instances along with its history; (iv) a heat-map analysis indicating when a copy was last used; (v) an efficiency analysis indicating copy location; and/or (vi) the total cost of the copy with a detailed cost break-down analysis when requested.

One or more of the data protection analytics applications 124-1, 124-2, . . . 124-N can be further configured to provide a vulnerability function that provides a detailed analysis into service level risk given the data protection model, and/or to provide a failure mode analysis function.

A plurality of mobile agents can be distributed throughout the SDDC infrastructure 110 or other computing platform and configured to collect and report metadata to the metadata monitor module 120. In a non-limiting illustrative embodiment, the plurality of mobile agents are implemented using logical containers, and are further configured to crawl through the resources of the SDDC infrastructure 110 or other computing platform, and mine relevant application information from the crawled resources.

In accordance with an embodiment of the present invention, a "mobile agent" or "mobile agent framework" can refer to smart agent technology designed for smart, adaptive and scalable collaboration among cloud scale distributed servers. A "mobile agent" or "mobile agent framework" can include a central server which downloads smart agents to connected nodes of the SDDC infrastructure 110 or other computing platform to detect and track the instances of the deployed applications and their data. For example, a mobile agent based discovery mechanism discovers installed applications, their data sets and their lifecycles.

Figure 2:
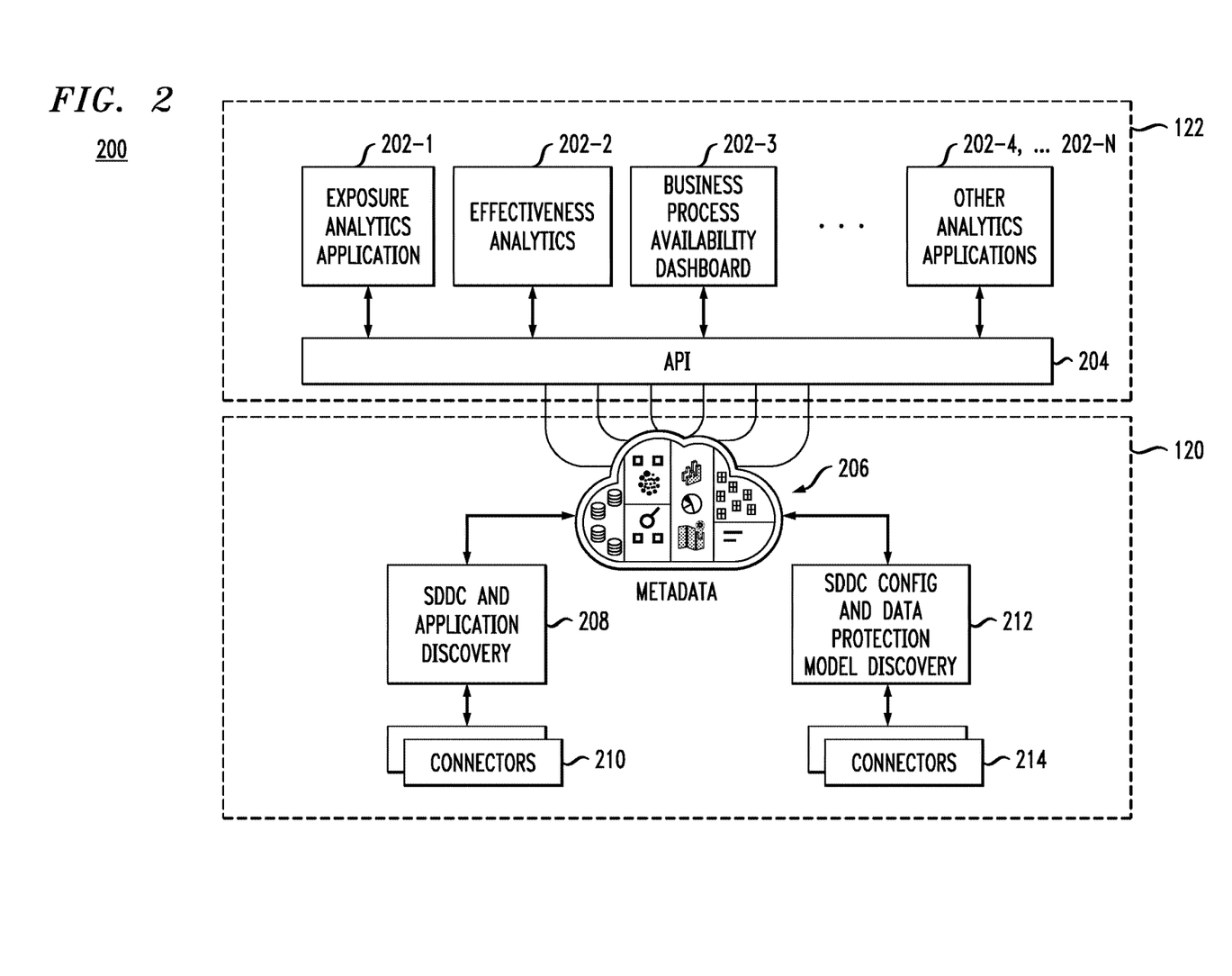
FIG. 2 illustrates a data protection analytics system according to an embodiment of the invention.

FIG. 2 illustrates a data protection analytics system according to an embodiment of the invention. Referring to FIG. 2, in a non-limiting illustrative embodiment, a data protection analytics system 200 includes a metadata monitor module 120 comprising an SDDC and application discovery module 208 and an SDDC configuration and data protection model discovery module 212 for discovering elements of the SDDC infrastructure 110 or other computing platform. The elements include, for example, a meta model and the elements of a meta model of the SDDC infrastructure 110 or other computing platform.

The SDDC and application discovery module 208 tracks data and application instances, characteristics, modifications and additions in the SDDC infrastructure 110 or other computing platform. Applications designed for these platforms exhibit certain classes of attributes, including but not limited to (i) agility, which is a rate of system element and application deployment in the SDDC infrastructure 110 or other computing platform; (ii) volume of information and amount of data generated; (iii) Type of information, for example, the variety of information that the deployed platform applications consume or generate; (iv) kind of data and information the deployed platform applications provide in the name of services to other application or to end users; and/or (v) semantics of the data, for example, eventually consistent semantic data, data loss tolerance and ability to recover from data loss, time bound information, etc. The application data grows exponentially and given the variability of the data stored and value drawn from, it may be difficult to determine what to protect and what should be the recovery time for the data.

Mechanics to a meta model and the elements of a meta model of the SDDC infrastructure 110 or other computing platform can include mobile agents as described herein, data center management console that uses the common information management (CIM) infrastructure deployed in an enterprise, user assisted discovery, wherein an administrator explicitly feeds the meta-model information manually, and the system optionally validates the customer defined SDDC schema, using the SDDC infrastructure 110 or other computing platform provider provided API to discover the basic configuration of the SDDC or other computing platform, and using other enterprise infrastructure mechanisms, such as, for example, active directory services, and other cloud based repository to detect the model elements.

The SDDC configuration and data protection model discovery module 212 tracks data protection schema in the SDDC infrastructure 110 or other computing platform and detects the changes to the data protection schema and keeps it up to date. Data protection schema is an extension to the SDDC meta-model that focuses on (i) defining which part of the SDDC infrastructure 110 or other computing platform is protected, and defining its copy configuration (e.g., location where the snapshots of the SDDC infrastructure 110 or other computing platform is maintained); (ii) topology of the data protection services (for example, EMC Data Domain®, Networker®, Veritas® NetBackup, CommVault® Backup tool, etc.) deployed in the SDDC infrastructure 110 or other computing platform and/or that the SDDC infrastructure 110 or other computing platform depends on; and (iv) defining the data instances of the applications that are protected and their copy configuration (e.g., metadata on where the backed up copies of these application instances are stored and their history).

In accordance with an embodiment of the present invention, the SDDC and application discovery module 208 and SDDC configuration and data protection model discovery module 212 are connected to the SDDC infrastructure 110 or other computing platform via connectors 210, 214, which are, in turn, connected to one or more customized mobile agents or mobile agent frameworks. For example, the mobile agents crawl thru the active compute elements of the SDDC infrastructure 110 or other computing platform, and mine necessary application information from relevant registry entries in the case of, for example, Windows® based runtime, or configuration control files in the case of, for example, Linux® runtime. The discovery modules 208 and 212, and/or the applications of the SDDC infrastructure 110 or other computing platform can include one or more APIs to pull or push the application profile information to the metadata monitor module 120, and/or a REST-based API supported by certain commonly used commercial grade application management software infrastructure. According to an embodiment of the present invention, when the SDDC infrastructure 110 or other computing platform detects data volume in either direction, an appropriate notification can be generated to alert all the subscribed analytics applications that may be tracking the application metadata changes.

The information from the discovery modules 208 and 212 is represented by element 206 in FIG. 2, and includes metadata associated with a plurality of data protection mechanisms distributed and operating throughout the SDDC infrastructure 110 or other computing platform, and metadata representing a schema of the SDDC infrastructure 110 or other computing platform, and one or more user applications executed on SDDC infrastructure 110 or other computing platform.

Referring to FIG. 2, in a non-limiting illustrative embodiment, the data protection analytics system 200 further includes a data protection analytics manager 122 comprising an API 204, an exposure analytics application 202-1, an effectiveness analytics application 202-2, a business process availability dashboard application 202-3, and other analytics applications 202-4, . . . 202-N.

The exposure analytics application 202-1 computes exposure value attributable to the lack of data protection mechanisms for non-protected resources. For example, the exposure analytics application 202-1 performs exposure analytics to determine what is not protected, what is the impact of not protecting it, and what is the cost of protecting it. Exposure analytics includes analysis on the availability of an infrastructure that is offering data protection for the unprotected applications, including, but not necessarily limited to the network connectivity in case of an off-premises data protection model for an application. Unprotected applications and their data sets increase the level of exposure to business processes. The exposure analytics application 202-1 spots inefficiencies caused by lack of protection in the current schema that would increase the exposure on the overall availability of the enterprise.

The effectiveness analytics application 202-2, which is described in more detail in connection with FIGS. 3A-3F, computes an effectiveness value attributable to the plurality of data protection mechanisms in the SDDC infrastructure 110 or other computing platform. For example, the effectiveness analytics application 202-2 assesses the effectiveness of a data protection workflow and schema that is already in place, by, for example, determining the necessity of data protection (e.g., is it necessary to create a backup, can a backup schedule and space be optimized).

The effectiveness analytics application 202-2 mines and/or uses the data protection metadata that keeps track of how many copies of the instances of an application are maintained in the system and their profile, and delivers, for example, the following insights into the effectiveness of the data protection schema: (i) number of copies of application instance data maintained in the system; (ii) total size of the data and metadata for all the copies of the application instance data; (iii) topology maps of the copies of the data instances along with the history; (iv) heat-map analysis of when was a copy used last; (v) efficiency analysis, including, for example, copy location (tier, server capacity, storage media, etc.); and (vi) total cost of the copy with an optional detailed cost break-down analysis.

The effectiveness analytics application 202-2 performs a vulnerability analysis to provide a detailed insight into the service level risk given a chosen protection model. The protection model can encompass a big picture view in terms of application stacks, their dependencies, and application data and their dependencies to deliver a particular set of services. This analytics provides comprehensive insights, including, for example, application topology maps, such as, an application dependency map of all the installed applications in an SDDC instance, complete analysis of what is protected and by whom in a dependency graph, and recovery point objective (RPO) and recovery time objective (RTO) analytics for all the application instances on demand. The effectiveness analytics application 202-2 further spots inefficiencies caused by over protection of data.

The business process availability dashboard application 202-3 provides an end user with a dashboard that shows copies of a data instance of an application on one or more creative views. These views include point in time views of data instances and their profiles, as well as the level of protection of an application being offered. The creative ways of visualization of scalable data (considering the number of applications and their data instances) are facilitated with this dashboard. The business process availability dashboard application 202-3 further provides an end user interface with centralized view of the managed copies in a backup infrastructure agnostic manner which is not bound to any one vendor, and graph based views of the protected applications, their data set and their cost of storing and accessing them for restore. The other analytics applications 202-4, . . . 202-N can include, but are not necessarily limited to, an SDDC configuration protection and restore application to take the snapshot of the current configuration of the SDDC infrastructure 110 or other computing platform, covering, for example, on-premises, and off-premises components of an SDDC instance in an enterprise. This information can be useful to restore the SDDC infrastructure 110 or other computing platform in an event of a disaster. According to an embodiment, snapshots are taken of the schema and the detailed configuration of the elements of the SDDC. The snapshot may not include the volume of data being operated on and sourced by the SDDC components.

The other analytics applications 202-4, . . . 202-N can include, but are not necessarily limited to, a simulation application for simulating a restore scenario and presenting a model of the cost and time window for restoring any specific service in an application graph, and a capacity application for analyzing application and data growth and their effect on a data protection model. Capacity analysis can include rates and trends of data increases, a current capacity used for protecting data, likely capacity growth given a protection model, covering what is protected, predicted growth patterns, what is not protected and growth of what is not protected, models and cost of protection. Data may be presented graphically.

The other analytics applications 202-4, . . . 202-N can include, but are not necessarily limited to, a failure mode analytics application, which collects data corresponding to all the failures reported by a current infrastructure while protecting the application data, analyzes the current quality of protection and identifies the noteworthy areas in the current protection model due to the failures. This analytics could further be extended to drive root cause analysis of the failure and make recommendations on addressing the failures specific to protecting specific instances of the application/data and the infrastructure issues.

FIGS. 3A-3F illustrate a flow of an analytic application performing data protection effectiveness analytics according to an embodiment of the invention. For example, the flow described in connection with FIGS. 3A-3F may occur via the effectiveness analytics application 202-2.

Figure 3A:
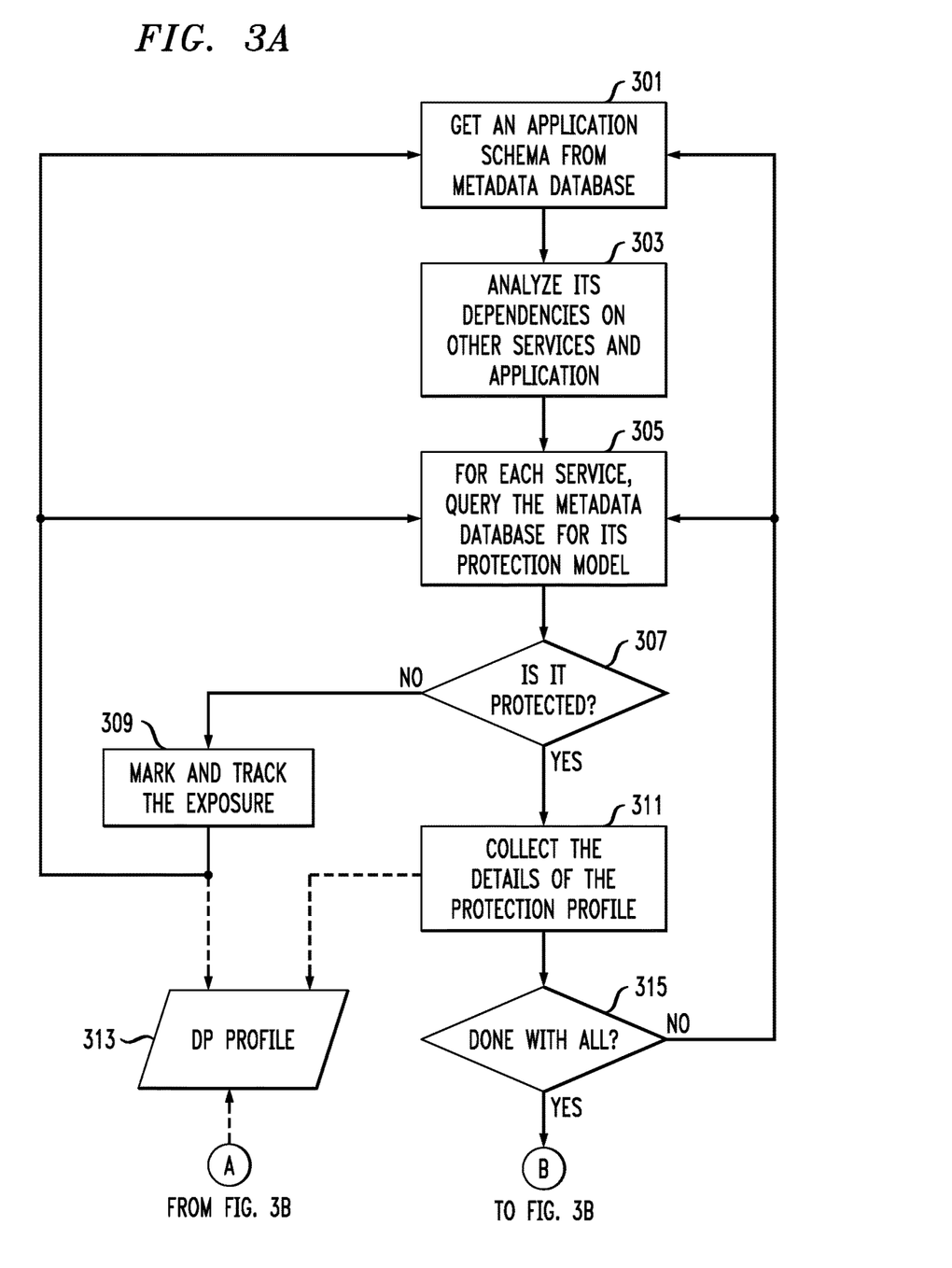
FIGS. 3A-3F illustrate a flow of an analytic application performing data protection effectiveness analytics according to an embodiment of the invention.
Figure 3B:
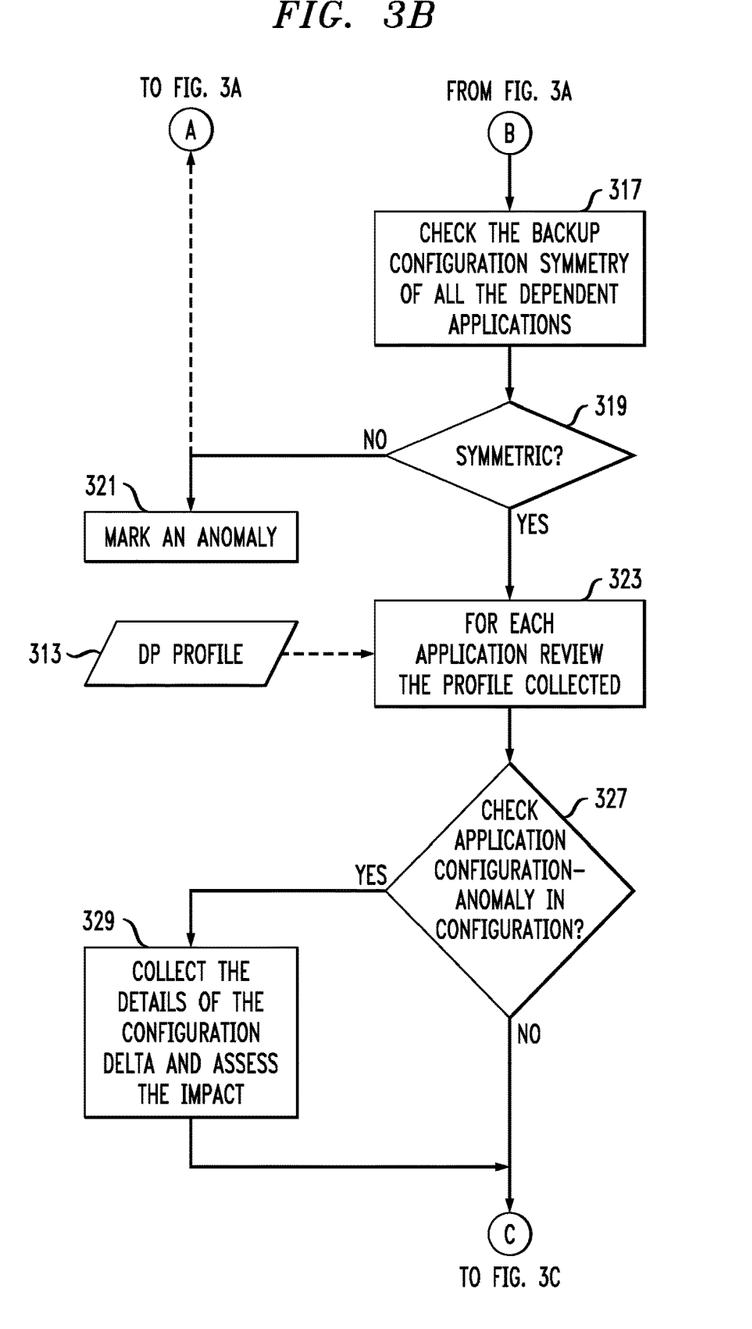

In connection with performing a data protection effectiveness analysis, according to an embodiment of the invention, the methodology may include retrieving an application schema from a metadata database (block 301), and analyzing the dependencies of the application on other services and applications (block 303). For each service, the metadata database is queried for the service's protection model (block 305), and a determination is made whether the service is protected at block 307. If the service is not protected, the method proceeds to block 309, where the exposure is marked and tracked, and the method returns to steps 301 or 305 for further retrieval of an application schema or querying the metadata database for other service protection models. If a service is protected, the method proceeds to block 311, where the details of the protection profile are collected and stored in a details protection (DP) profile 313. At block 315, it is queried whether the flow is complete with all application schema and/or services. If not, the method returns to steps 301 or 305 for further retrieval of an application schema or querying the metadata database for other service protection models. If yes at block 315, the method proceeds to block 317 where the backup configuration symmetry of all the dependent applications is checked.

Figure 3C:
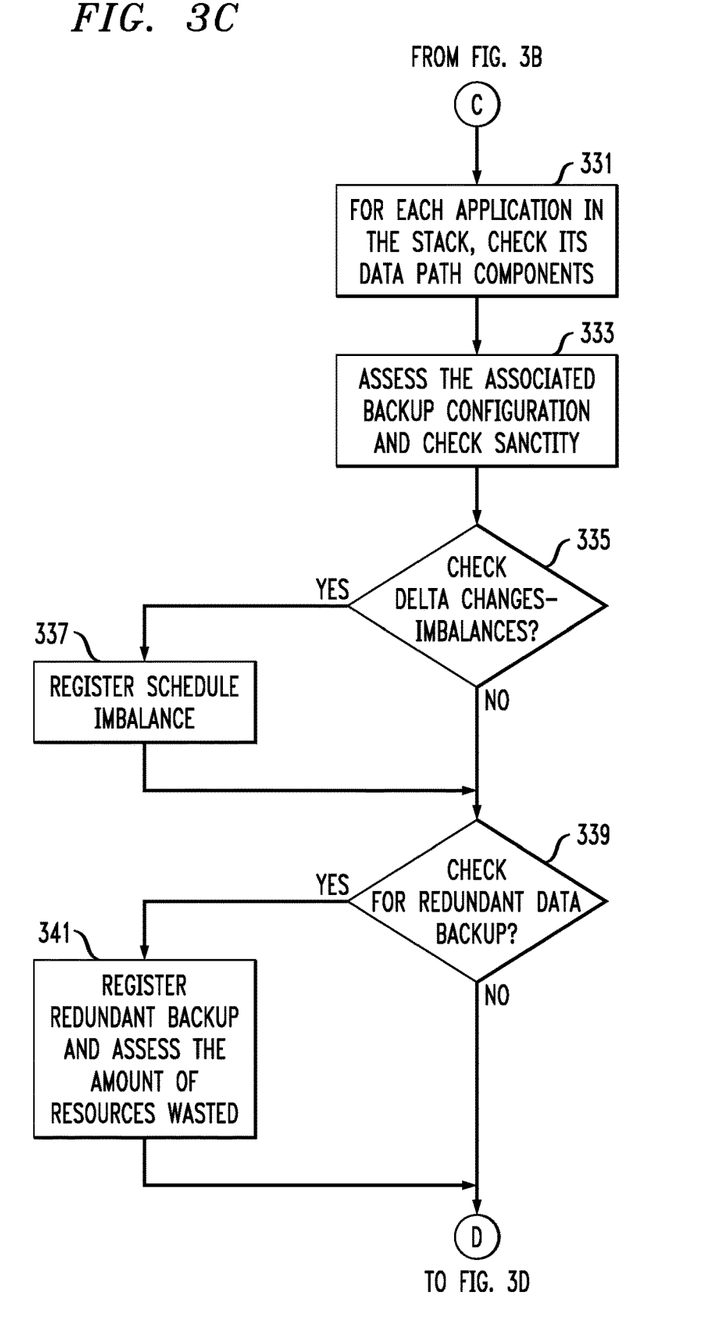

At block 319, if the backup configuration is not symmetric, for example, each application in the stack has a different backup schedule and configuration backup model, the anomalies are marked/recorded at block 321. The asymmetry could lead to distortion in the effectiveness of a restore. If yes at block 319, multiple checks are then performed. At block 323, using protection details from the DP profile 313, for each application, the collected profile is reviewed. At block 327, it is checked whether there are any anomalies in the application configurations. If there are anomalies, the details of the configuration anomalies are collected and the impact of each is assessed at block 329. If no anomalies, or after step 329, the method proceeds to step 331, where data path components for each application in the stack are checked. This step includes obtaining a list of objects and their dependent objects that are protected.

Figure 3D:
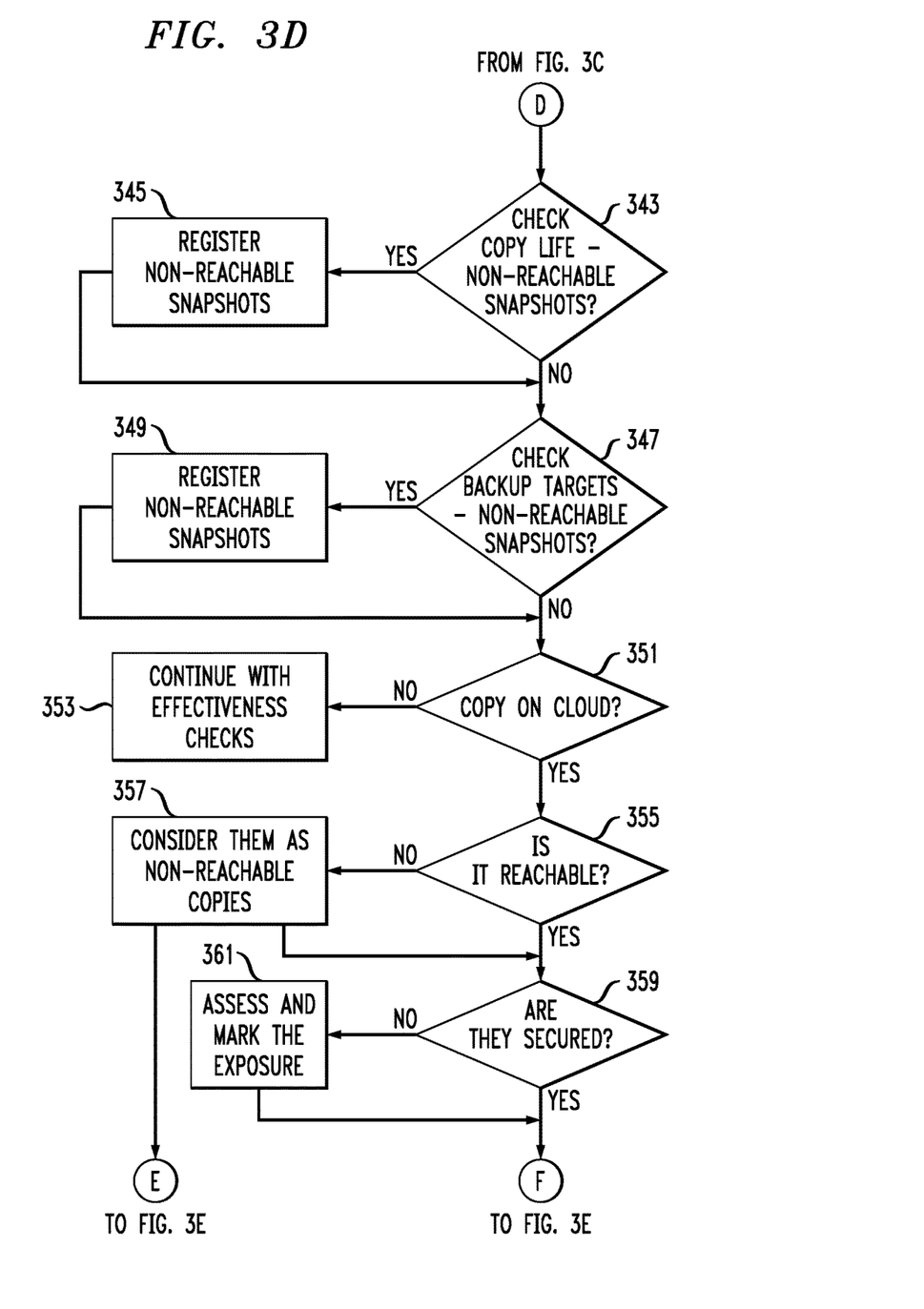

At block 333, the associated backup configuration assessed, including a sanctity check. At block 335, the rate of data change, volume of data change and the backup schedule are checked for any imbalances. If there are imbalances, they are registered at block 337. If no imbalances, or after step 337, the method proceeds to block 339 for a redundant data backup check. In this step, it is checked whether any application data is protected multiple times by more than one backup tool. At block 341, any redundant backups are registered and the amount of wasted resources is assessed.

At block 343, copy life is checked for non-reachable snapshots, and non-reachable snapshots are registered at block 345. At block 347, backup targets where snapshots are moved or stored are checked to determine that they are accessible. The non-reachable snapshots are registered at block 349.

Figure 3E:
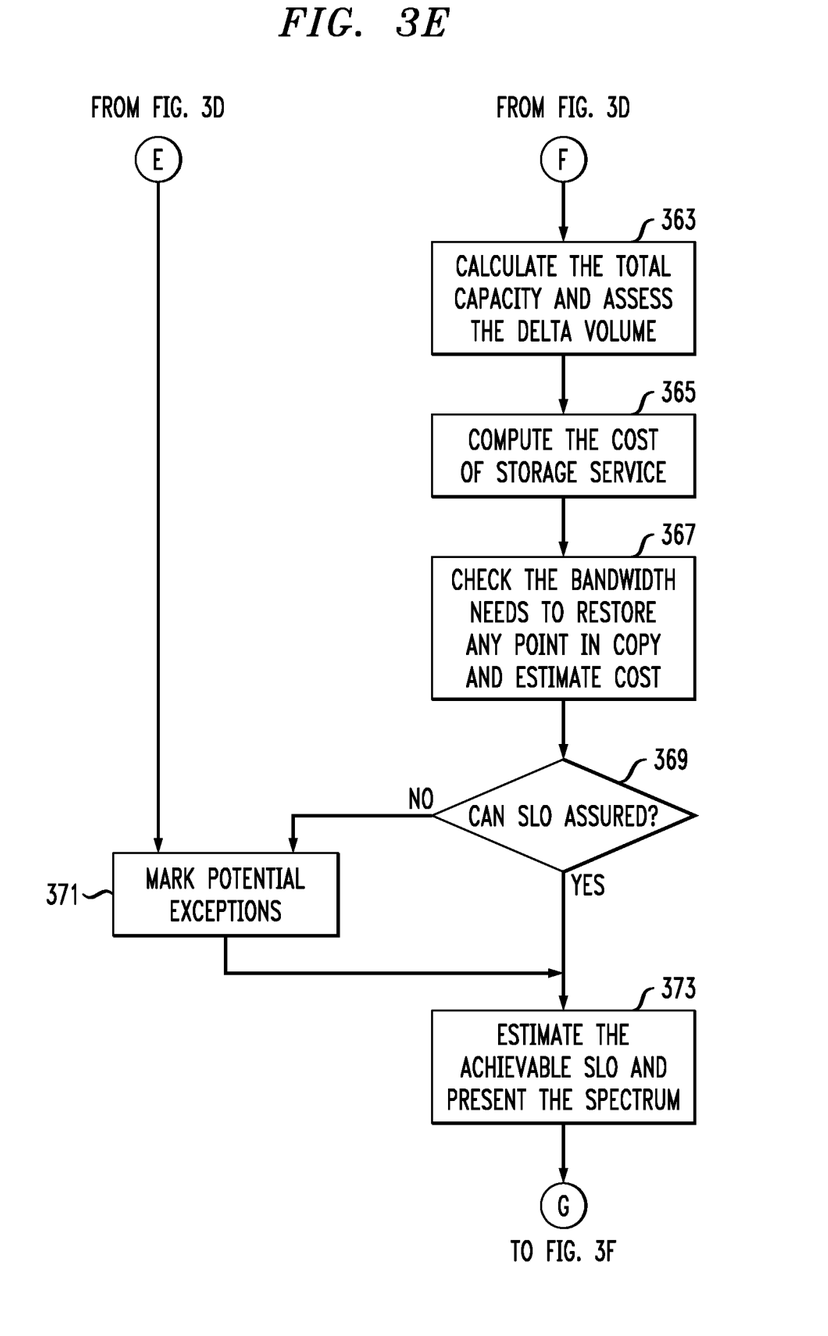

At block 351, is checked whether backup copies are in the cloud. If not, continue with effectiveness checks at block 353. If yes at block 351, query whether the backup copies on the cloud are reachable at block 355. In other words, perform accessibility checks on copies present in the cloud. If not reachable at block 355, consider the copies non-reachable at block 357.

Figure 3F:
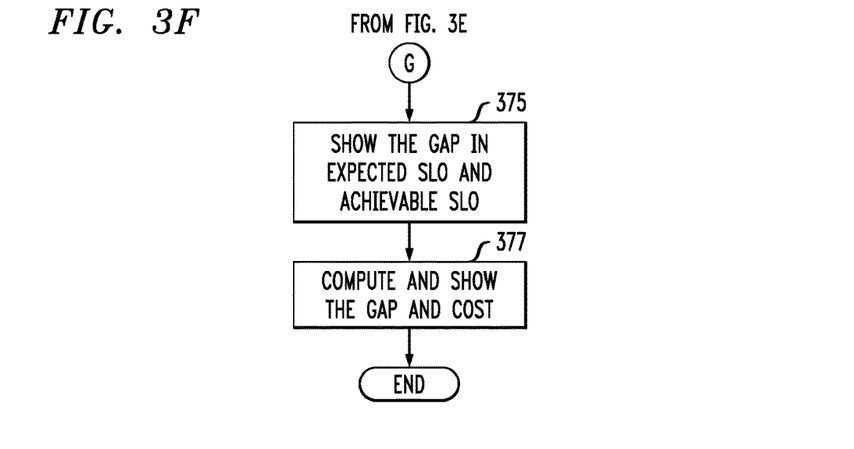

Blocks 359-373 are common for on-premises and off-premises and cloud based data protection. At block 359, for reachable cloud copies, determine whether those copies are secured. If no at block 359, assess and mark the exposure at block 361. If yes at block 359, proceed to block 363, where the total capacity of the cloud copies is calculated and the delta volume is assessed. Then, at block 365, the cost of storage service is computed based on the total capacity and the delta volume. The bandwidth needed to restore any point in a cloud copy is checked and the restoring cost is estimated at block 367. As used herein, "delta" is intended to be broadly construed, so as to encompass, for example, the difference between or the change between point in time copies of use data or the application configurations.

At block 369, it is determined whether backup service level objectives (SLOs) can be met considering the available bandwidth and the required bandwidth needed to restore. If not, potential exceptions are marked at block 371. If yes at block 369, or following block 371, the method proceeds to block 373 where the achievable SLOs are estimated and the spectrum is presented. At block 375, the gap in expected SLOs and achievable SLOs is shown, and at block 377, the gap and cost are computed.

In sum, the overall steps involved in a data protection effectiveness analytics include an integrity check on the schema in a metadata repository. If there is an anomaly, report it and isolate the potential suspect. Some of the integrity checks include checking all the applications and their storage configuration, check all the data protection tools and determining whether their configurations are valid, checking that no data copies are manipulated by more than one backup tool, detecting any unprotected data of the applications, and determining that the devices of the applications, backup devices and target devices are reachable.

For every application, (i) it is determined that configuration of the data copies, their backup schedules, delta and their location (on-premises or off-premises), etc., is included in the data repository; (ii) it is validated that the backup copies are reachable; and (iii) anomalies are detected. The anomalies can include unusable backup copies of the application data, application upgrades and resulting old-data that has been orphaned and/or is floating in storage, any orphaned backup copies of a current version of the application, any unusual sizes of primary and backup volume, delta size, etc. and problems with backup copy accessibility, and non-reachable snapshots.

The security profile of the backup copies is assessed through audit trails, metadata of the cloud copies are validated, and pre-work on SLO assessment of on-premises and off-premises situations is performed. The SLO assessment may consider number of backup copies per data volume, delta copies and their accessibility, snapshot copies, delta size, bandwidth availability, current state of the backup target, server CPU availability, compute capacity and restore storage capacity, and cost of network bandwidth and storage service.

The achievable SLO assessment is computed assuming a certain level of restore concurrency, and the achievable SLO assessment is compared with expected SLO and gaps are identified. The assessed gaps are used as noteworthy conditions (e.g., "hot-spots"). Some algorithms used for assessing the gaps include unexpected rate of change versus backup target storage type, mismatched restore time compared to an amount of data required to restore the target volume, imbalances in network bandwidth and the amount of data needed to restore, potential copy corruption, mismatched capacity in provisioned CPU for restoring, availability of copies on the cloud, and aggregated cloud SLOs provisioned. The effectiveness gaps and cost of the potential SLO breaches are based on analysis in this paragraph.

Figure 4:
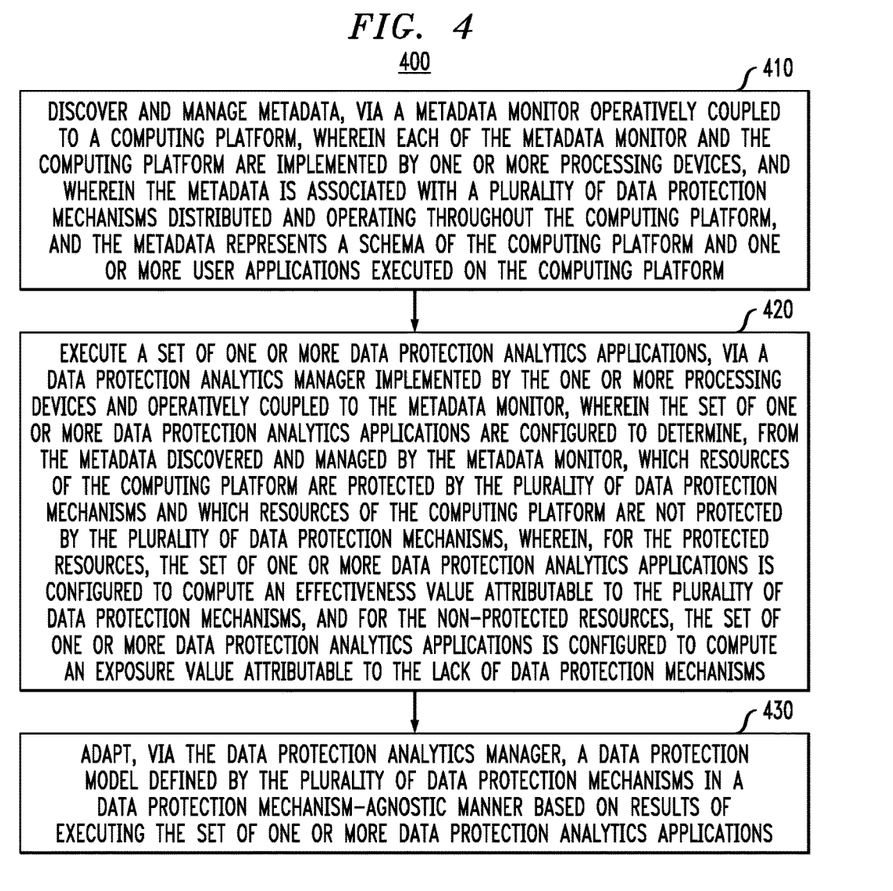
FIG. 4 illustrates a data protection analytics methodology according to an embodiment of the invention.

FIG. 4 illustrates a methodology 400 for data protection analytics, according to an embodiment of the invention. As shown, step 410 includes discovering and manage metadata, via a metadata monitor operatively coupled to a computing platform. Each of the metadata monitor and the computing platform are implemented by one or more processing devices. The metadata is associated with a plurality of data protection mechanisms distributed and operating throughout the computing platform, and the metadata represents a schema of the computing platform and one or more user applications executed on the computing platform.

Step 420 includes executing a set of one or more data protection analytics applications, via a data protection analytics manager implemented by the one or more processing devices and operatively coupled to the metadata monitor. The set of one or more data protection analytics applications are configured to determine, from the metadata discovered and managed by the metadata monitor, which resources of the computing platform are protected by the plurality of data protection mechanisms and which resources of the computing platform are not protected by the plurality of data protection mechanisms. For the protected resources, the set of one or more data protection analytics applications is configured to compute an effectiveness value attributable to the plurality of data protection mechanisms. For the non-protected resources, the set of one or more data protection analytics applications is configured to compute an exposure value attributable to the lack of data protection mechanisms.

Step 430 includes adapting, via the data protection analytics manager, a data protection model defined by the plurality of data protection mechanisms in a data protection mechanism-agnostic manner based on results of executing the set of one or more data protection analytics applications.

Figure 5:
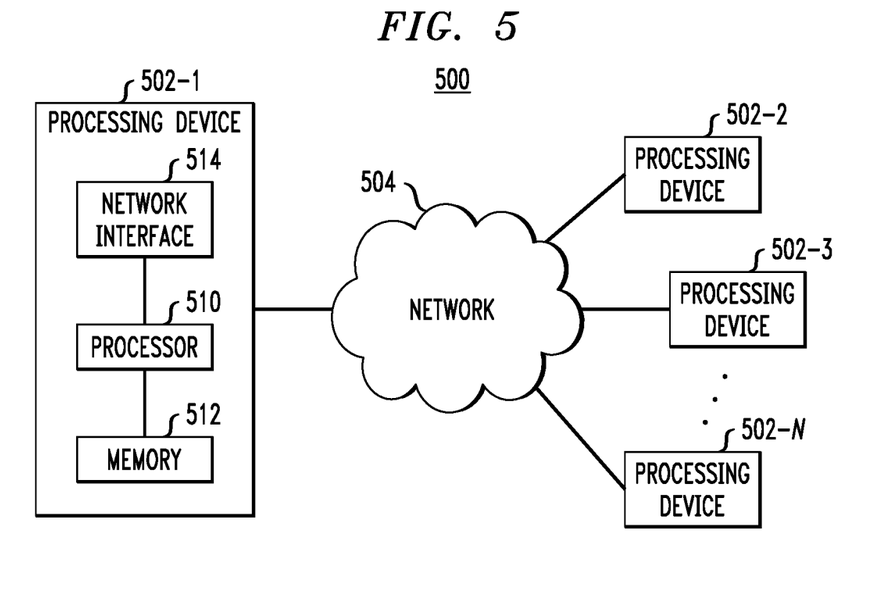
FIG. 5 illustrates a processing platform used to implement a computing platform environment in which data protection analytics techniques are implemented according to an embodiment of the invention.

As an example of a processing platform on which data protection analytics (e.g., environment 100 of FIG. 1 and system 200 of FIG. 2) can be implemented is processing platform 500 shown in FIG. 5. It is to be appreciated that processing platform 500 may implement both the monitoring and data protection analytics modules and functionalities described herein, as well as the monitored computing platform (e.g., SDDC) itself.

The processing platform 500 in this embodiment comprises a plurality of processing devices, denoted 502-1, 502-2, 502-3, . . . 502-N, which communicate with one another over a network 504. It is to be appreciated that the methodologies described herein may be executed in one such processing device 502, or executed in a distributed manner across two or more such processing devices 502. It is to be further appreciated that a server, a client device, a computing device or any other processing platform element may be viewed as an example of what is more generally referred to herein as a "processing device." As illustrated in FIG. 5, such a device generally comprises at least one processor and an associated memory, and implements one or more functional modules for instantiating and/or controlling features of systems and methodologies described herein. Multiple elements or modules may be implemented by a single processing device in a given embodiment.

The processing device 502-1 in the processing platform 500 comprises a processor 510 coupled to a memory 512. The processor 510 may comprise a microprocessor, a microcontroller, an application-specific integrated circuit (ASIC), a field programmable gate array (FPGA) or other type of processing circuitry, as well as portions or combinations of such circuitry elements. Components of systems as disclosed herein can be implemented at least in part in the form of one or more software programs stored in memory and executed by a processor of a processing device such as processor 510. Memory 512 (or other storage device) having such program code embodied therein is an example of what is more generally referred to herein as a processor-readable storage medium. Articles of manufacture comprising such processor-readable storage media are considered embodiments of the invention. A given such article of manufacture may comprise, for example, a storage device such as a storage disk, a storage array or an integrated circuit containing memory. The term "article of manufacture" as used herein should be understood to exclude transitory, propagating signals.

Furthermore, memory 512 may comprise electronic memory such as random access memory (RAM), read-only memory (ROM) or other types of memory, in any combination. The one or more software programs when executed by a processing device such as the processing device 502-1 causes the device to perform functions associated with one or more of the components/steps of system/methodologies in FIGS. 1-4. One skilled in the art would be readily able to implement such software given the teachings provided herein. Other examples of processor-readable storage media embodying embodiments of the invention may include, for example, optical or magnetic disks.

Processing device 502-1 also includes network interface circuitry 514, which is used to interface the device with the network 504 and other system components. Such circuitry may comprise conventional transceivers of a type well known in the art.

The other processing devices 502 (502-2, 502-3, . . . 502-N) of the processing platform 500 are assumed to be configured in a manner similar to that shown for computing device 502-1 in the figure.

The processing platform 500 shown in FIG. 5 may comprise additional known components such as batch processing systems, parallel processing systems, physical machines, virtual machines, virtual switches, storage volumes, etc. Again, the particular processing platform shown in this figure is presented by way of example only, and the federated web crawling and storage system shown as 500 in FIG. 5 may include additional or alternative processing platforms, as well as numerous distinct processing platforms in any combination.

Also, numerous other arrangements of servers, clients, computers, storage devices or other components are possible in processing platform 500. Such components can communicate with other elements of the processing platform 500 over any type of network, such as a wide area network (WAN), a local area network (LAN), a satellite network, a telephone or cable network, or various portions or combinations of these and other types of networks.

Furthermore, it is to be appreciated that the processing platform 500 of FIG. 5 can comprise virtual machines (VMs) implemented using a hypervisor. A hypervisor is an example of what is more generally referred to herein as "virtualization infrastructure." The hypervisor runs on physical infrastructure. As such, the techniques illustratively described herein can be provided in accordance with one or more cloud services. The cloud services thus run on respective ones of the virtual machines under the control of the hypervisor. Processing platform 500 may also include multiple hypervisors, each running on its own physical infrastructure. Portions of that physical infrastructure might be virtualized.

As is known, virtual machines are logical processing elements that may be instantiated on one or more physical processing elements (e.g., servers, computers, processing devices). That is, a "virtual machine" generally refers to a software implementation of a machine (i.e., a computer) that executes programs like a physical machine. Thus, different virtual machines can run different operating systems and multiple applications on the same physical computer. Virtualization is implemented by the hypervisor which is directly inserted on top of the computer hardware in order to allocate hardware resources of the physical computer dynamically and transparently. The hypervisor affords the ability for multiple operating systems to run concurrently on a single physical computer and share hardware resources with each other.

An example of a commercially available hypervisor platform that may be used to implement portions of the processing platform 500 in one or more embodiments of the invention is the VMware vSphere (commercially available from VMware Inc., Palo Alto, Calif.) which may have an associated virtual infrastructure management system such as the VMware vCenter. The underlying physical infrastructure may comprise one or more distributed processing platforms that include storage products such as, but not limited to, Isilon, VNX and VPLEX (commercially available from EMC Corporation, Hopkinton, Mass.). A variety of other computing and storage products may be utilized to implement the one or more services that provide the functionality and features described herein.

It was noted above that portions of the environment 100 and system 200 may be implemented using one or more processing platforms. For example, other processing platforms used to implement embodiments of the invention can comprise different types of virtualization infrastructure, such as container-based virtualization infrastructure using Docker containers or other types of containers, in place of or in addition to virtualization infrastructure comprising virtual machines.

It should again be emphasized that the above-described embodiments of the invention are presented for purposes of illustration only. Many variations may be made in the particular arrangements shown. For example, although described in the context of particular system and device configurations, the techniques are applicable to a wide variety of other types of data processing systems, processing devices and distributed virtual infrastructure arrangements. In addition, any simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A system, comprising:
    one or more processing devices operatively coupled via a communications network;
    a metadata monitor operatively coupled to a computing platform, each of the metadata monitor and the computing platform are implemented by the one or more processing devices, wherein the metadata monitor is configured to discover and manage metadata associated with a plurality of data protection mechanisms distributed and operating throughout the computing platform, and metadata representing a schema of the computing platform and one or more user applications executed on the computing platform;
    a data protection analytics manager, implemented by the one or more processing devices, operatively coupled to the metadata monitor, and comprising a set of one or more data protection analytics applications configured to determine, from the metadata discovered and managed by the metadata monitor, which resources of the computing platform are protected by the plurality of data protection mechanisms and which resources of the computing platform are not protected by the plurality of data protection mechanisms; and
    a user interface, implemented by the one or more processing devices;
    wherein, for the protected resources, the set of one or more data protection analytics applications is configured to compute an effectiveness value attributable to the plurality of data protection mechanisms, and for the non-protected resources, the set of one or more data protection analytics applications is configured to compute an exposure value attributable to the lack of data protection mechanisms;

wherein the data protection analytics manager is further configured to adapt a data protection model defined by the plurality of data protection mechanisms in a data protection mechanism-agnostic manner based on results of executing the set of one or more data protection analytics applications;

wherein, in computing the effectiveness value attributable to the plurality of data protection mechanisms, the set of one or more data protection analytics applications is configured to:

determine dependencies of the one or more user applications on each other;

determine whether a backup configuration of the one or more dependent user applications is asymmetric; and mark as anomalous any backup configurations determined to be asymmetric;

wherein the user interface is configured to report the anomalous backup configurations.

2. The system of claim 1, wherein the computing platform comprises a software defined data center.

3. The system of claim 1, wherein the computing platform comprises a hybrid cloud computing deployment.

4. The system of claim 1, wherein the computing platform comprises an on-premise infrastructure and an off-premise infrastructure.

5. The system of claim 1, wherein the computing platform comprises a big data platform.

6. The system of claim 1, wherein the set of one or more data protection analytics applications is further configured to generate a snapshot of the computing platform.

7. The system of claim 1, wherein the set of one or more data protection analytics applications is further configured to determine a root cause of one or more failures of the plurality of data protection mechanisms.

8. The system of claim 1, wherein the set of one or more data protection analytics applications is further configured to perform data protection capacity analysis and prediction.

9. The system of claim 1, wherein the set of one or more data protection analytics applications is further configured to determine service level objective conformance of the data protection model.

10. The system of claim 1, wherein the set of one or more data protection analytics applications is further configured to provide a data copy management function configured to mine metadata that keeps track of how many copies of the instances of an application are maintained in the computing platform and their profile; and return one or more results representing an effectiveness of the data protection mechanisms, the one or more results comprising: (i) the number of copies of application instance data maintained in the computing platform; (ii) the total size of the data and metadata for all the copies; (iii) a topology map of the copies for the data instances along with its history; (iv) a heat-map analysis indicating when a copy was last used; (v) an efficiency analysis indicating copy location; and (vi) the total cost of the copy with a detailed cost break-down analysis when requested.

11. The system of claim 1, wherein the set of one or more data protection analytics applications is further configured to provide a vulnerability function that provides a detailed analysis into service level risk given the data protection model.

12. The system of claim 1, wherein the set of one or more data protection analytics applications is further configured to provide a failure mode analysis function.

13. The system of claim 1, wherein the user interface is further configured to one or more of:

present copies of a data instance of an application on one or more views, wherein the one or more views comprise point in time views of data instances and their profiles as well as the level of protection of an application being offered;

present a centralized view of the managed copies in a backup infrastructure agnostic manner; and present a graph-based view of the protected applications, their data set and their cost of storing and accessing them for restore.

14. The system of claim 1, further comprising a plurality of mobile agents distributed throughout the computing platform and configured to collect and report metadata to the metadata monitor.

15. The system of claim 14, wherein the plurality of mobile agents are further configured to crawl through the resources of the computing platform, and mine relevant application information from the crawled resources.

16. The system of claim 1, wherein at least a portion of the one or more user applications are configured to each provide an application programming interface configured to report application profile information to the metadata monitor.

17. The system of claim 1, wherein at least a portion of the one or more user applications are configured to be responsive to a REST-based application programming interface configured to report application profile information to the metadata monitor.

18. The system of claim 1, wherein the metadata monitor obtains metadata from at least one of: a data center management console; user-assisted discovery; and an active directory service.

19. A method, comprising discovering and managing metadata, via a metadata monitor operatively coupled to a computing platform, wherein each of the metadata monitor and the computing platform are implemented by one or more processing devices, and wherein the metadata is associated with a plurality of data protection mechanisms distributed and operating throughout the computing platform, and the metadata represents a schema of the computing platform and one or more user applications executed on the computing platform;

executing a set of one or more data protection analytics applications, via a data protection analytics manager implemented by the one or more processing devices and operatively coupled to the metadata monitor, wherein the set of one or more data protection analytics applications are configured to determine, from the metadata discovered and managed by the metadata monitor, which resources of the computing platform are protected by the plurality of data protection mechanisms and which resources of the computing platform are not protected by the plurality of data protection mechanisms, wherein, for the protected resources, the set of one or more data protection analytics applications is configured to compute an effectiveness value attributable to the plurality of data protection mechanisms, and for the non-protected resources, the set of one or more data protection analytics applications is configured to compute an exposure value attributable to the lack of data protection mechanisms;

adapting, via the data protection analytics manager, a data protection model defined by the plurality of data protection mechanisms in a data protection mechanism-agnostic manner based on results of executing the set of one or more data protection analytics applications;

wherein, in computing the effectiveness value attributable to the plurality of data protection mechanisms, the set of one or more data protection analytics applications is configured to:
- determine dependencies of the one or more user applications on each other;
- determine whether a backup configuration of the one or more dependent user applications is asymmetric; and
- mark as anomalous any backup configurations determined to be asymmetric;

reporting, via a user interface, the anomalous backup configurations.

20. An article of manufacture comprising a processor-readable storage medium having encoded therein executable code of one or more software programs, wherein the one or more software programs when executed by one or more processing devices implement the steps of:

discovering and managing metadata, via a metadata monitor operatively coupled to a computing platform, wherein each of the metadata monitor and the computing platform are implemented by the one or more processing devices, and wherein the metadata is associated with a plurality of data protection mechanisms distributed and operating throughout the computing platform, and the metadata represents a schema of the computing platform and one or more user applications executed on the computing platform;

executing a set of one or more data protection analytics applications, via a data protection analytics manager implemented by the one or more processing devices and operatively coupled to the metadata monitor, wherein the set of one or more data protection analytics applications are configured to determine, from the metadata discovered and managed by the metadata monitor, which resources of the computing platform are protected by the plurality of data protection mechanisms and which resources of the computing platform are not protected by the plurality of data protection mechanisms, wherein, for the protected resources, the set of one or more data protection analytics applications is configured to compute an effectiveness value attributable to the plurality of data protection mechanisms, and for the non-protected resources, the set of one or more data protection analytics applications is configured to compute an exposure value attributable to the lack of data protection mechanisms;

adapting, via the data protection analytics manager, a data protection model defined by the plurality of data protection mechanisms in a data protection mechanism-agnostic manner based on results of executing the set of one or more data protection analytics applications, wherein, in computing the effectiveness value attributable to the plurality of data protection mechanisms, the set of one or more data protection analytics applications is configured to:
- determine dependencies of the one or more user applications on each other;
- determine whether a backup configuration of the one or more dependent user applications is asymmetric; and
- mark as anomalous any backup configurations determined to be asymmetric;

reporting, via a user interface, the anomalous backup configurations.

\* \* \* \* \*